July 11, 1961  L. J. DUPLANTIS ET AL  2,991,882
SHRIMP AND FISH SEPARATING MACHINE AND METHOD
FOR SEPARATING SHRIMP AND FISH
Filed Jan. 15, 1958  3 Sheets-Sheet 1
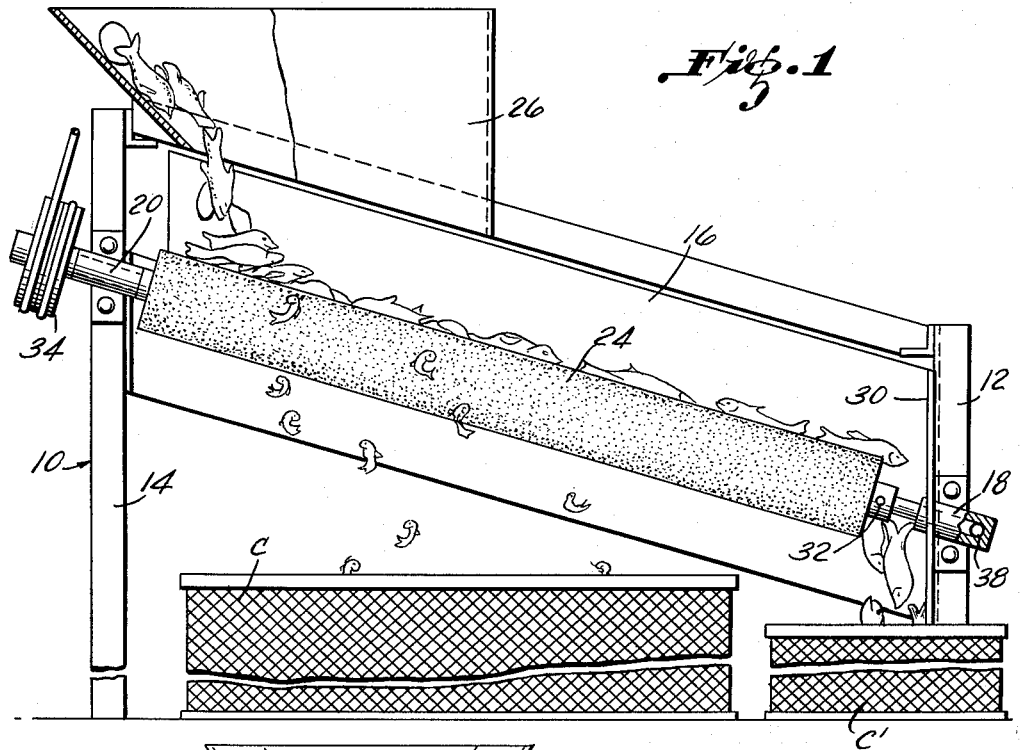
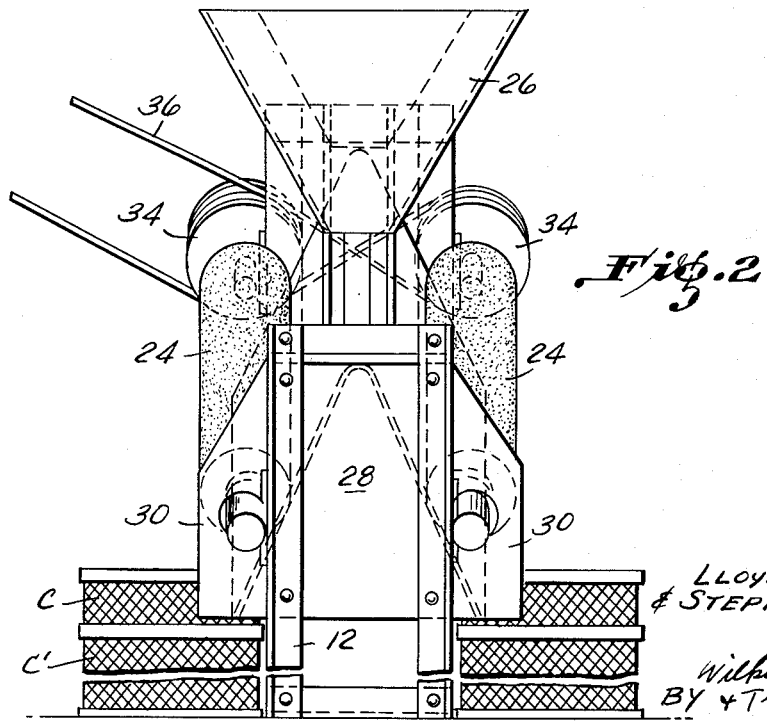
INVENTORS
LLOYD J. DUPLANTIS
& STEPHEN D. POOL, JR.
BY Wilkinson Mawhinney
& Thibault
ATTORNEYS

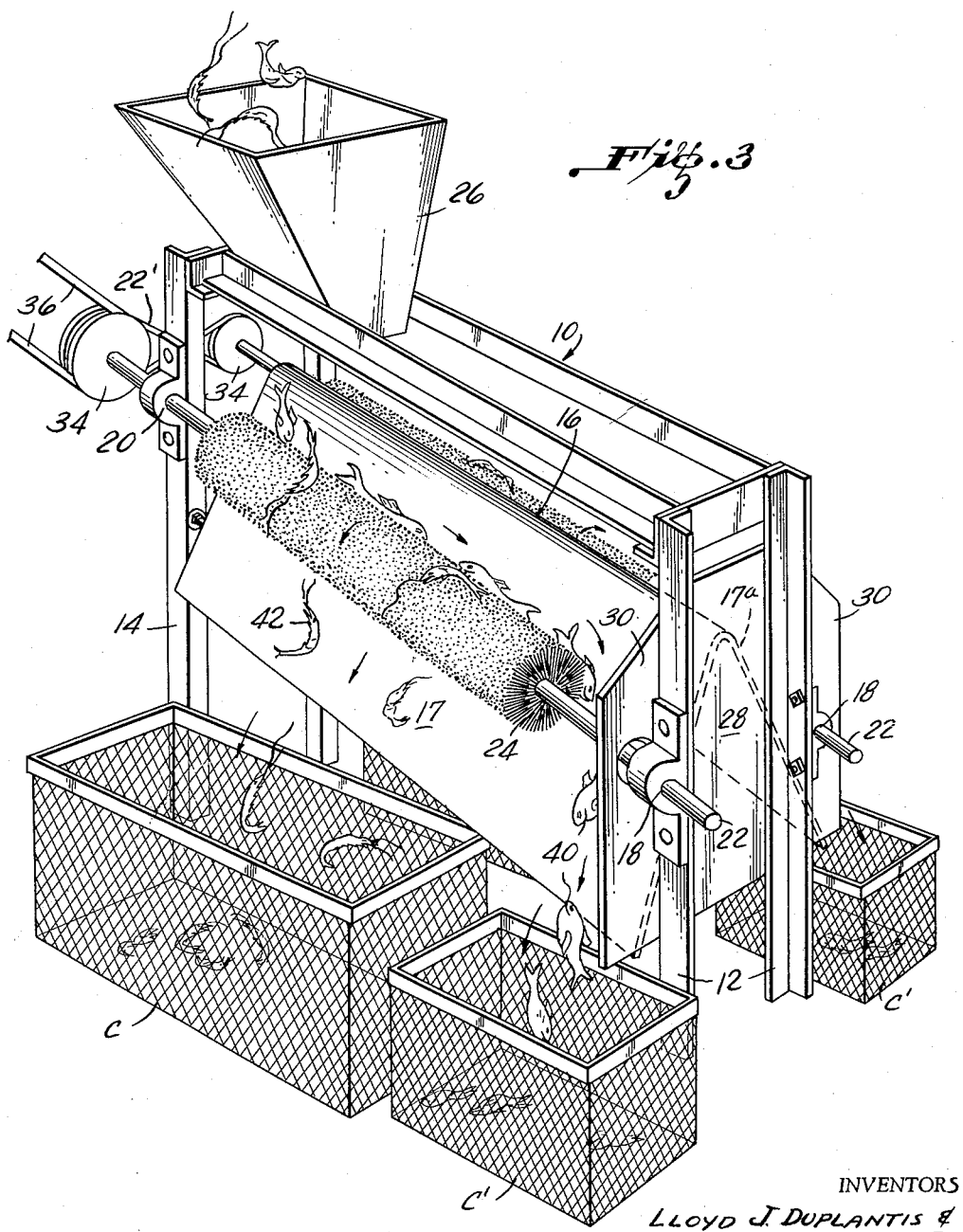

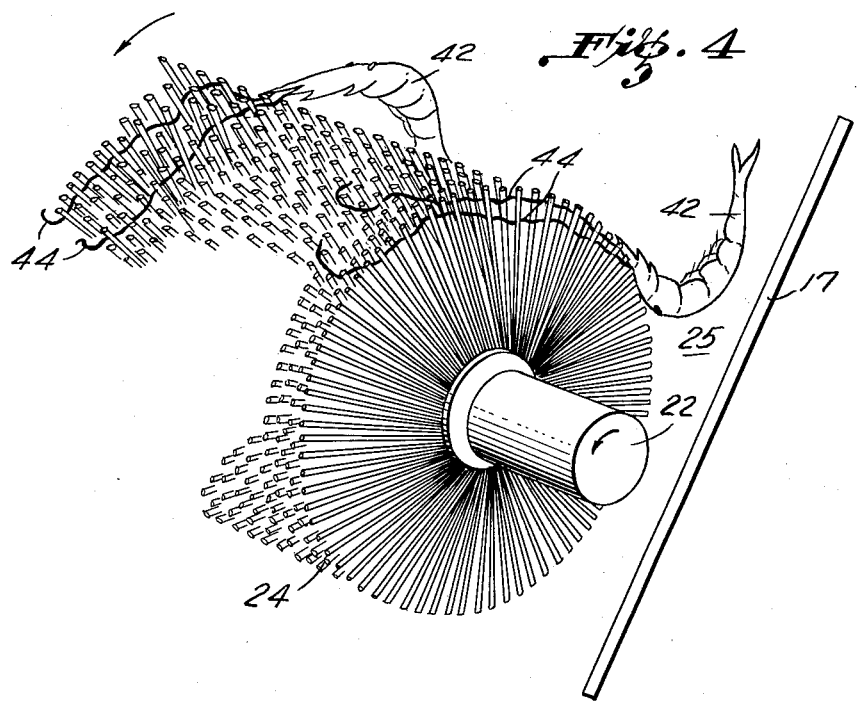
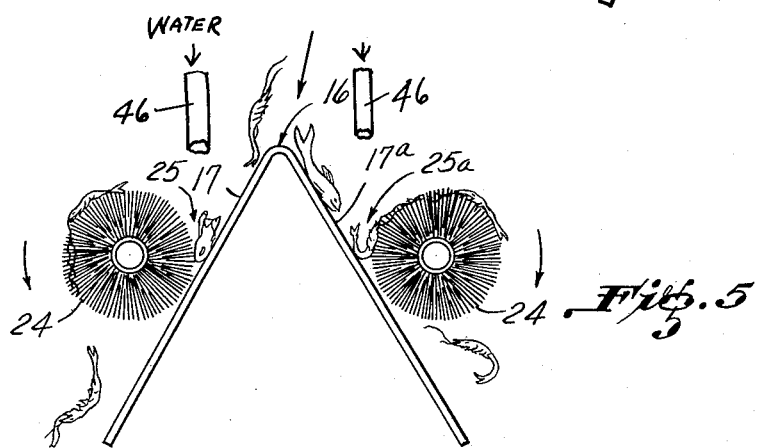

UNITED STATES PATENT OFFICE 2,991,882
Patented July 11, 1961

2,991,882
SHRIMP AND FISH SEPARATING MACHINE AND METHOD FOR SEPARATING SHRIMP AND FISH
Lloyd J. Duplantis, Chauvin, La., and Stephen D. Pool, Jr., 624 Wood St., Houma, La.
Filed Jan. 15, 1958, Ser. No. 709,435
9 Claims. (Cl. 209—77)

The present invention relates to shrimp and fish separating machine and method for separating shrimp and fish and is a continuation-in-part of our prior application Serial No. 610,286, now abandoned, filed September 17, 1956, which is a continuation-in-part of our now abandoned application Serial No. 336,046, filed February 10, 1953.

This invention relates to new and useful improvements in separating apparatus and method and the primary object of the present invention is to provide a machine and method for separating shrimp and fish.

Another important object of the present invention is to provide a shrimp and fish separating machine involving a divider having a power-driven brush supported alongside thereof for the purpose of engaging and lifting the feelers of shrimp that are placed between the divider and the brush while permitting fish to move to a fish collecting area.

A further object of the present invention is to provide a shrimp and fish separating machine composed of a downwardly and forwardly extending inverted V-shaped divider adjacent each side wall of which there is rotatably supported a brush that rotates upwardly toward the divider for the purpose of engaging the feelers of shrimp to raise and discharge the shrimp from a mixture of fish and shrimp placed between the divider and the brushes.

A still further aim of the present invention is to provide a shrimp and fish separating machine of the aforementioned character that is extremely simple and practical in construction, strong and reliable in use, efficient and durable in operation, inexpensive to manufacture, and otherwise well adapted for the purposes for which the same is intended.

The present invention contemplates a process or method of separating whiskered sealife and non-whiskered sealife in a mixed catch by taking advantage of the natural characteristic that some sealife, such as shrimp, are provided with whiskers or feelers, while the sealife, such as fish, are not so equipped.

The present invention also contemplates the process of withdrawing the whiskered sealife from the mixed catch by entraining the whiskers of the whiskered sealife and removing them from the mixed catch.

One method of carrying out this process consists of the steps of bringing the bristles of a rotating brush into engagement with the shrimp and fish so that the bristles entrain the feelers of the shrimp and withdraw the shrimp from the mixed catch and move the fish to a different discharge station from that of the shrimp.

These and other ancillary objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the present invention and with parts broken away for the convenience of explanation;

FIGURE 2 is a front elevational view of FIGURE 1;

FIGURE 3 is an isometric view, taken on an enlarged scale, of the single form of machine illustrated.

FIGURE 4 is a fragmentary isometric view of one of the brushes in relation to a gauge plate and illustrating the manner of engagement of the bristles with the feelers or whiskers of shrimp.

FIGURE 5 is a vertical sectional view taken transversely through the machine showing a pair of oppositely rotated brushes in conjunction with a substantially inverted V-shaped divider including duplex gauge plates.

Referring now to the drawings in detail, wherein, for the purpose of illustration, there is disclosed a preferred embodiment of the present invention, the numeral 10 represents a supporting frame including forward and rear support members 12 and 14 that support therebetween an inverted V-shaped divider or trough 16. The ends of the divider 16 are suitably fixedly secured to the upper portions of the support members 12 and 14, and the rear support member 14 is higher than the forward support member 12 so that the divider will incline downwardly and forwardly.

Forward and rear downwardly and forwardly inclined bearings 18 and 20 are suitably fixed to the support members 12 and 14. The bearings 18 and 20 rotatably support the ends of shafts 22 that extend axially through the cores of a pair of substantially cylindrical brushes 24. Bearings 18 and 20 are so located that the brushes 24 will be disposed relatively close to opposite side walls of the divider 16 and in parallel relationship to the divider intermediate the upper and lower portions of the divider.

A hopper 26 is fixed to the frame 10 over the rear end portion of the divider 16 so that a mixture of shrimp and fish may be discharged onto the upper end of the divider to slide downwardly and forwardly between the divider and the brushes 24.

A baffle and deflector plate 28 is secured to the forward support member 12 in front of the divider 16 and includes end portions 30 that extend outwardly beyond the brushes 24 to be engaged by fish passing from the lower ends of the brushes 24. The end portions 30 are formed with openings accommodating the forward bearings 18.

Any suitable means may be provided for rotating the brushes 24 which are fixed on the shafts 22 by set screws or the like 32. This rotating means for the shafts 32 and brushes 24 may comprise pulleys 34 fixed on the rear ends of the shafts 22 and connected by a crossed belt 22', one of said pulleys 22 being engaged and driven by a pulley belt 36 extending from a motor-driven pulley, not shown, the arrangement being such that the brushes 24 will be rotated in opposite directions relatively and upwardly at the sides thereof confronting the side walls of the divider 16.

In practical use of the present invention, relatively elongated containers C are placed and suitably supported under the brushes 24 at opposite sides of the pair and additional containers C' are placed at the lower ends of the brushes 24, as shown in FIGURE 1, and the brushes 24 are caused to rotate upwardly toward the divider 16.

A mixture or catch of shrimp and fish is dumped into the hopper 26 and the fish and shrimp will pass through the hopper and onto the upper end of the divider 16. Some of the fish and shrimp will pass on both sides of the divider and between the upper end of the divider and the upper ends of the brushes. The shrimp and fish will begin to slide downwardly and the bristles of brushes 24 will engage the feelers of the shrimp and lift the shrimp upwardly and away from the divider to fall into the containers C. The fish are not provided with feelers like the shrimp. Therefore they will not be lifted by the brushes and the fish will pass from the lower ends of the brushes into the containers C' with the fish being deflected into the containers C' by the end portions 30 of deflector 28.

In order to prevent the shaft 22 from sliding downwardly and forwardly, the bearings 18 are provided with forward closed ends in which ball elements 38 may be received to engage the lower extremities of the shafts 22.

Although a belt and pulley drive means for the brushes 24 has been illustrated, it is obvious that other suitable means may be employed for rotating the brushes 24 toward each other and upwardly relative to the divider 16, such as power-driven gears or a power-driven bevelled gear located between the rear ends of the shafts 22 and meshing with complemental bevelled gears secured upon the rear ends of the shafts.

As the shrimp feelers are relatively long, they will become interdigitated with the bristles of the brushes to permit the shrimp to be discharged over the brushes. However, since the scales of the fish will not become engaged with the bristles in this manner, the fish will merely be turned over while being moved over the brushes.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Referring more particularly to FIGURES 3, 4 and 5, 17 and 17ª represent gauge plates which are parts of the inverted V-shaped divider 16 and which are connected at their upper ends and diverge downwardly therefrom so as to provide troughs 25 and 25ª with the rotary brushes 24 as more particularly shown in FIGURE 5.

The fish are represented at 40, and as more particularly shown in FIGURE 3 they are adapted to drop from the troughs 25 and 25ª at the lower ends of the brushes 24, which terminate in spaced relation to the end portions 30 of the baffle or deflector plate 28. The fish 40 fall into the receptacle or basket C'.

The shrimp are represented at 42 and the feelers or whiskers thereof at 44.

FIGURE 4 is an enlarged view showing the feelers or whiskers 44 interengaged with the bristles of the brush 24. This FIGURE 4 also shows how the shrimp are carried over the brush 24 to the side thereof away from the gauge plate 17 so that such shrimp may fall into the receptacle or basket C which preferably extends the length of the brush 24 as the delivery of the shrimp may take place at any point along the length of the brushes 24.

At 46 are indicated water lines for the purpose of supplying streams of water to the troughs 25, 25ª.

The feelers or whiskers are smooth and it is necessary to provide brushes 24 as such brushes have numerous, preferably closely spaced bristles to engage therewith. As the brush rotates, its bristles comb through the feelers or whiskers 44 of the shrimp 42 in the trough 25. As this combing action occurs, the feelers inter-digitate with the bristles. This interdigitation of the feelers with the bristles of the brush provides a mechanical grip by the brush on the feelers, lifting the shrimp from the trough 25 and carrying the same up over the top of the brush and to the opposite side of the brush from the gauge plate 17. As the brush 24 rotates in the direction of the arrow indicated in FIGURE 4, the shrimp 42 will be carried over until they reach a point where the support of the brush is withdrawn; whereupon the shrimp 42 will drop by gravity into the basket C. Should the whiskers 44 become interlocked with the bristles of the brush the weight of the body of the shrimp will cause such shrimp to jerk free from the whiskers, leaving the whiskers intertwined with the bristles of the brush while the shrimp fall whiskerless into the catch basket C.

As shown in FIGURE 5 there is small clearance between the tips of the bristles of the brushes 24 and gauge plates 17, 17ª. This clearance will however not be sufficient to permit the shrimp or fish to descend to the gap. In the event that the bristles actually contact the sloping walls 17, 17ª, due to their rotation, the brush bristles will soon wear to a point where minute clearance will exist.

The use of brushes 24 having bristles is important because the same readily shed fish slime. Brushes however will continue to grab whiskers of shrimp even though considerable slime is allowed to build up on the brushes. This is so because of the intertwining and interdigitation which takes place.

However the water lines 46 will lubricate the brushes and will remove the slime.

An operative unit consists of one brush 24 and its mating gauge plate 17. As many of these units may be used in a machine as desired in order to increase capacity.

In practicing the method of separating shrimp and fish in a mixed catch according to this invention the mixed catch and one or more rotating brushes having bristles thereon are brought into engagement with one another so that the bristles entrain the feelers of the shrimp and carry the shrimp upwardly away from and outwardly of the mixed catch and release the shrimp at one or more discharge stations and the fish are moved to at least one discharge station different from that of the shrimp. The fish can be moved to their discharge stations by gravity, manually or by mechanical means, such as by the rotation of the brushes in conjunction with gravity by arranging the brushes and the supporting means for the mixed catch at an inclination downwardly towards the fish discharging stations in the manner illustrated described in FIGURES 1 through 5 of the drawings.

What we claim is:

1. A shrimp and fish separating machine comprising a supporting frame, a downwardly and forwardly inclined gauge plate supported by the frame and having upper and lower portions, a cylindrical brush rotatably supported on the frame parallel to said gauge plate with sides close to and confronting the sides of said gauge plate between said upper and lower portions for engaging, in a mixture of shrimp and fish disposed between the brush and gauge plate, only the feelers of shrimp disposed between the brush and said gauge plate, and means for rotating the brush upwardly at said confronting side to carry the shrimp upwardly away from the plate and over the brush to fall therefrom.

2. A shrimp and fish separating machine comprising a supporting frame, an inclined gauge plate carried by the frame, a cylindrical brush composed of bristles with clipped edges rotatably supported in the frame with the clipped edges of its bristles in relation to the plate to form a trough therewith through which passes a mixture of shrimp and fish, and means for rotating the brush in a direction in which the bristles confronting the plate move upwardly to comb through the feelers of the shrimp and become interdigitated therewith to carry the shrimp upwardly over the brush to the side opposite the plate where the shrimp are free to fall from the brush, the fish in said trough being rotated, and means including the inclined gauge plate and brush to move the fish downwardly to a discharge point at the end of the trough.

3. A shrimp and fish separating machine comprising a supporting frame, an inclined gauge plate carried by the frame, a cylindrical brush having numerous long bristles placed in relation to the plate to form a trough therewith for comingled fish and shrimp, and means for rotating the brush in a direction upwardly of the plate at that side of the brush confronting the plate to cause the bristles of the brush to comb through the feelers of the shrimp and to entrain the shrimp to move with the brush upwardly and away from the plate and to be dropped at the opposite side of the brush while the rotating bristles merely move the fish through the trough, and means for introducing a stream of water along the trough cooperating with the brush and trough to move the fish to a discharge point at the end of the trough and incidently to remove slime from the bristles of the brush.

4. A shrimp and fish separating machine comprising a supporting frame, a downwardly inclined inverted V-shaped divider member fixed to the frame and having opposite sides and upper and lower portions, a pair of spaced cylindrical brushes each brush of the pair rotatably supported on the frame at opposite sides of and parallel to said member with sides close to and confronting the sides of said member to form a trough to contain the fish and shrimp between said upper and lower portions for engaging the feelers of shrimp disposed between the brushes and the sides of the member, and means for rotating the brushes upwardly at said confronting sides to carry shrimp upwardly away from the member and over the brushes to fall therefrom.

5. A machine for separating whiskered marine bodies from non-whiskered marine bodies comprising a fixed inclined member, a rotatable member cooperating with said fixed member to define a trough for the reception of a mixed catch of said bodies, said rotatable member having means thereon for entraining the whiskers of the whiskered bodies to remove the whiskered bodies from the trough when the stated means on the rotatable member is rotated, and an outlet at the lower end of the trough for the discharge of the non-whiskered bodies.

6. A device for removing whiskered marine bodies from non-whiskered marine bodies in a mixed catch comprising whisker entangling means positioned to come into contact with the mixed catch to engage the whiskers of the whiskered bodies in the mixed catch, and operating means connected to operate said whisker entangling means to move said entangling means to engage the whiskers of the whiskered bodies to separate the whiskered bodies from the mixed catch.

7. A machine for separating whiskered marine bodies from non-whiskered marine bodies comprising a receiver for receiving a mixed catch of said bodies, said receiver comprising a movable member having means thereon for entangling the whiskers of the whiskered bodies, and means connected to said movable member to cause movement of said movable member to remove the entangled whiskered bodies from said receiver by their whiskers.

8. A method of separating whiskered marine life from non-whiskered marine life in a mixed catch comprising mechanically entangling the whiskers of the whiskered marine life in the mixed catch and withdrawing the entangled whiskered bodies from the mixed catch by pulling on the whiskers to thereby separate the whiskered marine bodies from the mixed catch.

9. A method of separating whiskered marine life from non-whiskered marine life in a mixed catch comprising introduced a mixed catch of whiskered and non-whiskered marine life into a receptacle, mechanically entangling the whiskers of the whiskered marine life, withdrawing the entangled whiskered marine life entrained by their whiskers from the receptacle and separately removing the non-whiskered marine life from the mixed catch.

References Cited in the file of this patent

UNITED STATES PATENTS

| Number | Name | Date |
|---|---|---|
| 469,252 | Jessup | Feb. 23, 1892 |
| 589,141 | Rice et al. | Aug. 31, 1897 |
| 741,956 | Burnett et al. | Oct. 20, 1903 |
| 900,189 | Morral et al. | Oct. 6, 1908 |
| 1,307,046 | Getz et al. | June 17, 1919 |
| 1,787,835 | On | Jan. 6, 1931 |
| 2,062,946 | Sorensen | Dec. 1, 1936 |
| 2,292,068 | Grayson | Aug. 4, 1942 |
| 2,462,682 | Schubert | Feb. 22, 1949 |
| 2,663,900 | Greiner et al. | Dec. 29, 1953 |
| 2,668,619 | Wormser et al. | Feb. 9, 1954 |
| 2,702,628 | Lucius et al. | Feb. 22, 1955 |
| 2,755,501 | Samanie | July 24, 1956 |
| 2,776,746 | Envoldsen | Jan. 8, 1957 |
| 2,888,709 | Lapeyre | June 2, 1959 |